United States Patent [19]

Wrasidlo et al.

[11] 4,432,875

[45] Feb. 21, 1984

[54] SEMI-PERMEABLE MEMBRANES AND PROCESSES FOR MAKING THE SAME

[75] Inventors: Wolfgang J. Wrasidlo; Karol J. Mysels, both of La Jolla, Calif.

[73] Assignee: Brunswick Corporation, Skokie, Ill.

[21] Appl. No.: 268,403

[22] Filed: May 29, 1981

[51] Int. Cl.$^3$ .............................................. B01D 31/00
[52] U.S. Cl. .................................. 210/500.2; 427/245
[58] Field of Search .................. 210/500.2, 490, 433.2, 210/321.1; 264/41; 427/244, 245, 246; 521/64

[56] References Cited

U.S. PATENT DOCUMENTS

| | | | |
|---|---|---|---|
| 4,087,388 | 5/1978 | Jensen et al. | 210/500.2 X |
| 4,199,445 | 4/1980 | Chang et al. | 210/500.2 X |
| 4,203,847 | 5/1980 | Grandine | 210/490 |
| 4,302,334 | 11/1981 | Jakabhazy et al. | 210/500.2 |

FOREIGN PATENT DOCUMENTS 55-69627  5/1980  Japan .................................. 210/500.2

Primary Examiner—Frank A. Spear, Jr.
Attorney, Agent, or Firm—Edward D. O'Brian; K. H. Boswell

[57] ABSTRACT

Semi-permeable, porous membranes useful as filtration and reverse osmosis membranes can have or can consist of a porous layer of a hydrophobic polymer rendered hydrophilic at its surface by the presence of a surfactant containing both hydrophobic and hydrophilic groups, the surfactant being bonded to the polymer. Such a membrane may be made by quenching a previously made dry membrane in a solution of the surfactant and then banking the membrane. Such a membrane may also be made by contacting a membrane manufactured by quenching a dope of the hydrophobic polymer with such a solution of the surfactant prior to the membrance being dried after being formed by quenching. Such a membrane can also be made by forming a dope of the hydrophobic polymer and the surfactant and then quenching the dope to form the membrane, this quenching serving to contact the membrane with the surfactant as it is being formed.

11 Claims, No Drawings

SEMI-PERMEABLE MEMBRANES AND PROCESSES FOR MAKING THE SAME

BACKGROUND OF THE INVENTION

This invention pertains to new and improved synthetic semi-permeable membranes or barriers and to processes for making these membranes.

The terms "membrane" and "semi-permeable" are on occasion used in various different manners. Because of this it is considered desirable to define the meanings attributed to these words as they are utilized in this specification in order to minimize the chances of confusion.

The term "membrane" as used herein is intended to designate a comparatively thin physical structure of such a character that certain substances such as water or other solvents can pass through it while others such as, for example, colloidal particles cannot pass through it. Because of this meaning of the word membrane it is considered that any membrane can be defined as or considered as a form of a barrier which will pass at least common solvents and in some cases comparatively small particles but which normally will retain or block the passage of particles or substances.

The term "semi-permeable" as used in this specification is intended to designate the ability to pass a solvent or solvent mixture but not to pass various dissolved or colloidal substances. The word "porous" indicates pore of any size or size range capable of retaining particles or molecules primarily because of the sizes of such particles or molecules.

Most commonly the term "porous membrane" is used to designate membranes which will pass a solvent, normally water, but which will not particles in excess of about 10 microns in diameter. On occasion porous membranes are referred to as microfiltration, ultrafiltration, membranes in accordance with the sizes of the particles which will or will not pass through them. A reverse osmosis membrane must have a porous layer and a non-porous, semi-permeable layer capable of passing a solvent by a solution mechanism. On occasion porous membranes are also referred to as microporous or as sterilizing membranes depending upon the pore sizes within such membranes. These pore sizes of course reasonably correspond to the sizes of particles or substances which can be passed through these membranes.

It is not believed that an understanding of the present invention requires a detailed understanding of the pore sizes of various different specific porous or semi-permeable membranes as are indicated in the preceding paragraph. It is, however, considered that the present invention requires an understanding of the fact that any such membrane may consist essentially of a single porous or semi-permeable layer or may consist of a plurality of individual separate layers. When a porous membrane consists of a plurality of layers normally the various individual layers will be employed so as to serve separate, different functions. Normally at least one of such individual layers will in and of itself be capable of being utilized as a single layer porous membrane.

This can be illustrated by referring to a known type of reverse osmosis membrane which, in its simplest form, consists of a synthetic, porous, somewhat flexible, thin film or membrane which serves as a physical support for an active layer of an essentially non-porous character. This active layer in this composite membrane is substantially inert and is capable of separating water from dissolved salts by dissolving water so that water can move from one surface of the active layer to the other. This composite structure falls within the definition of membrane indicated in the preceding discussion. The support film also comes within the scope of the definition of membrane indicated in the preceding.

In the particular composite reverse osmosis membrane described the porous support is utilized to provide a degree of physical reinforcement to the active layer so as to prevent rupture of the active layer and to provide passages which are suitable to convey liquid which has passed through the active layer so as to be separated from other materials away from the active layer. The support may in and of itself be utilized as a porous membrane or barrier inasmuch as the pores in the support are of such a physical dimension as to be capable of separating out various types of particles, such as, for example, colloidal particles when the support is used by itself in an appropriate structure.

Those familiar with the field of porous membranes, and in particular, the field of reverse osmosis membranes, will recognize that many different characteristics of such membranes are important from a utilitarian and commercial standpoint. An understanding of the present invention is also not considered to require a discussion as to all of such characteristics.

It is believed, however, that an understanding of the present invention requires a review of the fact that it is important that any porous membrane used be free or apparently free from discontinuities or other similar defects which might allow leakage through the membrane. It is also believed that an understanding of the present invention also requires a recognition of the fact that the speed with which a liquid can move through a porous membrane is quite important from a commercial standpoint. In general, the greater the ability of a porous membrane to pass a liquid the smaller the equipment capacity required to process a given volume of a suspension or solution so as to separate liquid from it.

In order to achieve relatively high flow rates for a liquid or liquid mixture through a semi-permeable or porous membrane it is desirable to form the membrane of a comparatively "stiff" or physically strong polymer or polymer system which will not rupture under normal conditions of use and which will not tend to compress significantly so as to close up or decrease the sizes of the pores in the membrane when subjected to working pressures. It is also desirable for the membrane to be of such a character that the liquid separated with it will wet the surfaces of the pores of the membrane. This latter is not only important in connection with the flow rates achieved, but is significant in another unrelated regard.

A common method of testing a membrane for a possible leak or rupture involves measuring the pressure required to force air through a membrane which has been wetted with water. This is a so-called "bubble point" test. The so-called bubble point increases with decreasing pore size in the membrane and is affected by the hydrophilic character of the membrane. A hydrophobic membrane or a membrane which has lost its ability to be wetted by water may exhibit the characteristics of a membrane having a ruptured surface even though, in fact, the membrane may be without any defect. As a consequence of this possibility of an erroneous indication of a defect, the wetability of the membrane is important so that the membrane will be accepted for many "critical" uses where any surface discontinuity would be undesirable.

The physical requirements necessary to achieve the strength characteristics of a desirable porous or semipermeable membrane and other desirable characteristics are best achieved by forming a porous membrane as noted from a hydrophobic or essentially hydrophobic polymer or polymer system. When a membrane of this type is manufactured by sintering techniques the interiors of the pores of the membrane are clearly not hydrophilic. This is also true when a membrane is formed by evaperation of a solvent or solvent system or by mechanical fissuring of a sheet. When hydrophobic porous or semi-permeable membranes are manufactured by quenching a dope in a liquid bath, normally the resulting membranes will exhibit desirable hydropholic characteristics until they are dried. As a result of drying, these hydrophilic-like characteristics are lost from this type of membrane.

A number of ways have been proposed for imparting desirable hydrophilic characteristics to a hydrophobic or essentially hydrophobic membrane as indicated in the preceding discussion. Because of the inherent nature of the hydrophobic polymers or polymer systems these characteristics cannot be created or restored merely by immersing a membrane as noted in water.

It has been proposed to overcome this problem by oxidizing the interiors of the pores within such membranes with a strong oxidizing agent so as to cause such surfaces to become essentially hydrophilic in character. Such oxidation procedures have not been advantageous because of costs and because of difficulties in producing a uniform product under commercial conditions. It has also been proposed to impart desired hydrophilic characteristics to hydrophobic membranes by treating these membranes with a solution of one or more common surfactants. While this expedient will impart hydrophilic characteristics, to a hydrophobic membrane these characteristics will be lost in using or testing the membrane as a result of the wetting agent being leached from the membrane.

BRIEF SUMMARY OF THE INVENTION

The present invention is intended to provide new and improved porous membranes based upon hydrophobic polymers or polymer systems which are of such a character that they may always be easily wetted by solutions such as are intended for use with such membranes. The invention is also intended to provide porous membranes of hydrophobic compositions as noted which do not suffer any degradation or loss of physical properties as a result of being dried so as to become substantially solvent free in character. The invention is also intended to provide porous membranes which, depending upon how they are manufactured, can be effectively utilized to physically separate comparatively small particles or which can be utilized as reverse osmosis membranes for separating salts and other compounds from various types of solutions. The invention is also concerned with porous membranes as noted which are comparatively inexpensive to manufacture and which are reasonably suited for their intended utilization.

It is not to be assumed from the preceding that the invention is only concerned with porous membranes per se. The invention is intended to provide processes for making porous membranes as indicated in the preceding which may be easily and conveniently carried out with a minimum of difficulty. The invention is intended to provide processes as noted which can be carried out utilizing the existing equipment as used for producing known types of porous membranes, and which are not significantly more complex or expensive than the known process for producing such membranes.

Those aspects of the present invention which are primarily concerned with a porous membrane per se are achieved by providing a semi-permeable porous membrane which comprises a layer of a hydrophobic polymer system in which the improvement comprises: a polymeric surfactant bonded to the hydrophobic polymer in the membrane in such a manner as to be substantially incapable of being removed from the membrane by contact with water encountered during the use of the membrane, said surfactant serving to render the hydrophobic polymer system hydrophilic in character.

Those aspects of the present invention which are primarily concerned with the production of membranes as noted are achieved by a process comprising the steps of: contacting a hydrophobic polymer system with a solution of a polymeric surfactant having both hydrophobic and hydrophilic groups located along the polymer chain and then baking the polymer system with the surfactant in contact with the surface of the polymer system at a temperature which is sufficiently high to bond the surfactant to the polymer system to an extent such that it is substantially incapable of being removed from the polymer system during the use of the membrane by contact with water but which is sufficiently low so that heat does not degrade the properties of the polymer system. In some cases such baking may be minimal.

DETAILED DESCRIPTION

The various membranes of the present invention either consist of or include a layer of a porous, hydrophobic polymer or polymer system which has physical characteristics or properties as are commonly considered to be desirable for use in semi-permeable porous membranes. These porous membranes will not pass particles larger than about 10 microns in diameter. Preferably they are of a microporous character and will pass particles of less than about 0.05 microns in diameter. These hydrophobic membranes or layers used with the invention may be conveniently formed utilizing such known hydrophobic polymers as polysulfone, polycarbonate, polystyrene, polyimide, polypropylene, polyvinylene fluoride, polyvinyl chloride and other very closely related, similar polymers.

Porous membranes of such polymers may be formed by known or established sintering drying or fissuring techniques or may be formed by creating a "dope" of the polymer used in a solvent or solvent system and then quenching the dope in a known or conventional manner. Because various ways of making hydrophobic membranes of various thickness and degrees of porosity and having various different shapes are known, it is not considered necessary to discuss the production of these hydrophobic membranes to any significant extent in this specification. The hydrophobic membrane or layers used with the invention will normally be in the form of comparatively flat thin sheets or tissue of a thickness sufficient for the membrane to have adequate physical strength to resist tearing or puncturing during the normal conditions of handling and use. If desired, these membranes may be formed into other shapes such as hollow fibers or tubes in accordance with known techniques as may be desired in a particular application.

A critical facet of the present invention concerns the treatment of any such porous membrane so as to render it hydrophilic in character as a result of the use of a polymeric surfactant. This term "surfactant" is used in this specification to designate a compound which decreases the interfacial tension of a liquid or liquid system against the surface of the pores within a porous membrane as noted. Normally any surfactant used will be a wetting agent which will facilitate the surface of the pores within a membrane as noted being wetted by water. If desired, a mixture of different wetting agents may be employed in any specific application.

Any surfactant used should have a moderately high molecular weight sufficient so that the surfactant will tend to bond in a manner as subsequently discussed to the hydrophobic polymer present. As a practical matter it is considered that this will normally require that the surfactant have a molecular weight of at least about 1500. On the other hand the surfactant used should have a molecular weight which is sufficiently low so that the surfactant will not tend to clog the pores of the membrane or will not tend to otherwise impede flow through the membrane. This is believed to require that the surfactant used have a molecular weight no greater than about 10,000. It should be noted that these are average molecular weights and that as usual for polymers molecules of higher and lower molecular weight are necessarily present. It will, of course, be recognized that no sharp change in either bonding or change in flow rate occurs with the use of surfactants having molecular weights falling outside of the weight range noted.

The surfactants which are used with the present invention contain both hydrophilic and hydrophobic groups along the length of the surfactant polymer chain. Further, these groups are preferably not located along the polymer chain so as to be closely spaced in a regular manner, preferably grouped into extended sequences or blocks and particularly grouped into only a very small number of blocks such as three blocks in the preferred surfactant.

The surfactants employed with the invention are capable of utilizing virtually any type of a polar group having hydrophobic or hydrophilic characteristics along the length of a polymer chain. Among the suitable hydrophilic groups capable of being present upon a surfactant polymer chain used with the invention are groups such as the —OH, —COOH, —COO—, —SO$_4$, —SO$_3$, =CO, —NH$_2$, —NHR, —NR$_3$+,

and other closely related groups. Among the hydrophobic groupings which may be employed along the length of the surfactant chain are groups such as —CH$_3$, =CH$_2$, =CH, —CCl, —CBr, —CF, —CI, —CH$_2$—O—CH—CH$_3$ and related groups.

It will, of course, be recognized that many different polymers can be formed which are capable of being utilized with the invention as surfactants. It is considered that preferred results are achieved utilizing block co-polymers of propylene oxide and ethylene oxide such as are sold under the trademark Pluronics ® by the BASF-Wyandote Corp. of Wyandote, Michigan, U.S.A. It is considered that best results are achieved using polymers of this type having a polyoxypropylene central chain terminated by two polyoxyethylene chains. Preferred results are believed to be achieved when such polymers are composed of ingredients as noted such that the polyoxypropylene central chains contribute from about 70% to about 90% of the molecular weight of the polymer, the remainder being polyoxyethylene.

Particularly suitable results can also be achieved by utilizing polyvinyl alcohol—polyvinyl acetate co-polymers as surfactants in practicing this invention. Such co-polymers are normally referred to as polyvinyl alcohol polymers. They are normally manufactured by hydrolyzing polyvinyl acetate polymers to a degree such that there is in excess of 60% and possibly up to 99% conversion of the acetate groups to the alcohol groups along the polymer chain in an essentially non-uniform random manner.

Although surfactants based upon polyvinyl alcohol can be utilized effectively with the present invention, it is not often desired to utilize such surfactants because of possible toxicity problems in connection with the ultimate use of any particular porous membrane.

Any amount of surfactant in a membrane will be desirable in promoting wetting of the membrane. Obviously if too little surfactant is present to cause noticeable or apparent wetting no significant benefit will be received. In many applications the amount of surfactant present above a minimum is of little importance. Thus up to 2% or even 5% or more surfactant may be incorporated into the membrane but most of such large amount will not be bonded to the polymer and is readily removed when the membrane is contacted with water. Such excess surfactant may be desirable as in rewetting of the membrane but may often be undesirable as a "leachable" contamination of the filtrate.

Under these conditions it is considered desirable to carefully limit the quantity of the surfactant present in a final membrane produced in accordance with this invention. Another reason for limiting the amount of surfactant in the membrane is that some polymers are susceptible to a loss of mechanical strength known as stress cracking in the presence of surfactants. It is considered that the susceptibility of at least some of such polymers to such stress cracking tends to increase in accordance with the amount of surfactant in the membrane. Because of this it is considered preferable to limit the surfactant content of the membrane to the minimal amount which will be reasonably effective in imparting to the membrane a hydrophilic character. This will of course vary to some extent depending upon the specific polymer and the specific surfactant used in a specific application. It is considered that effective results in achieving the desired hydrophilic characteristics without unnecessarily promoting stress cracking can be achieved by providing a membrane having a content of from about 0.10% to about 0.40% by weight of the surfactant. Limiting the amount of surfactant may be effected by treating the membrane with a solution sufficiently dilute in surfactant so that the amount retained by the membrane is desirably small yet sufficient to become bonded and to impart the desirable hydrophilic character to the polymer. Alternatively the membrane may be treated with a relatively large amount of surfactant, then baked to bond some of it to the polymer and then rinsed with water to remove the undesirable excess of surfactant.

The manner of locating an amount of a surfactant as indicated in place on the surface within a hydrophobic polymer system constituting all or part of a membrane will vary to a limited extent in accordance with the manner in which the polymer system is created. It will of course be recognized that "solid", porous hydrophobic polymer system membranes can be created by known techniques and by techniques involving first forming a "dope" of the polymer or polymer mixture used in a solvent or solvent system followed by liquid quenching of a film of the dope in another solvent and then rinsing and drying the resultant membrane. In accordance with the present invention a membrane produced by either of these techniques or procedures may be contacted with the surfactant by merely contacting the completed membrane in a solution—normally by dipping it in an aqueous solution of the surfactant. In those cases where the membrane is created by quenching a dope, the surfactant may be added to the final rinse bath employed. As subsequently discussed after such contact with a bath of a surfactant, a membrane in accordance with this invention should be baked.

If desired, it is possible to obtain membranes in accordance with this invention by either placing the surfactant within the polymer dope which is utilized to create a membrane in accordance with a liquid quenching procedure as briefly indicated in the preceding, or to locate the surfactant within the quenching bath which is utilized to quench the polymer dope so as to produce a membrane of the polymer or polymer system employed. In both of these cases in effect, the surfactant is placed in contact with the polymer system as the polymer system is created as a result of simply being present as the polymer mixture used "congeals" to a porous, essentially solid type, physical structure.

The fact that some surfactant may be "caught up" within the actual solid type physical polymer structure created by quenching is normally immaterial since so little of the surfactant will be present that the physical properties of the polymer system will not be degraded to any normally noticeable extent. Because of the entrainment of the surfactant within the polymer structure created by quenching of either a dope containing the surfactant or by quenching a dope in a bath containing the surfactant, normally it is possible to rinse the membrane produced as a result of the quenching prior to baking the membrane without removing from the membrane so much surfactant that the benefits of the invention will not be achieved.

This baking step employed involves heating the membrane with the surfactant in contact with the interior of the membrane so as to be in contact with the surfaces of the pores of the membrane at a temperature which is sufficiently high to bond the surfactant to the polymer system to such an extent that it is substantially incapable of being removed from the polymer system during the use of the membrane as a result of the membrane being contacted with water such as is normally encountered during the use of the membrane. The temperature should, however, be sufficiently low so that the heat does not degrade the properties of the polymer system. Such baking should be carried out only so long as is reasonably necessary to accomplish the desired degree of bonding so as to avoid any possible detrimental consequences resulting from presently unknown reactions which may be both time and temperature dependent.

The minimum temperature required to achieve such bonding is believed to to a limited extent in accordance with the natures of the specific materials present or used. Generally speaking a temperature of about 120° C. is considered to be required so as to adequately adhere or bond the surfactant to the polymer material present. Inasmuch as the surfactant used will tend to be held in place to a degree by entrainment when a membrane has been created from a dope containing the surfactant or by quenching in a bath containing the surfactant it is believed that slightly lower temperatures may be effective to at least a degree to achieve bonding of the surfactant in these cases. Similarly, the maximum temperature which should be used will vary somewhat depending upon the material present. Generally speaking, the maximum temperature should be no greater than about 180° C. to avoid possible detrimental consequences.

A membrane containing the surfactant should not be heated longer than is reasonably necessary to bond or otherwise adhere the surfactant to the polymer or polymer structure present so as to avoid detrimentally affecting the membrane. The time which will be used will vary depending upon the temperature employed. Generally speaking the higher the temperature at which the baking is carried out the shorter the time required in order to obtain an adequate bonding or "fixing" of the surfactant.

The exact mechanism of such bonding is not clearly known or understood. It is considered highly probable that during the use of a temperature as indicated that some rearrangement of the surfactant occurs and that somehow or another this creates many comparatively weak bonds between the hydrophobic portions or the surfactant and the hydrophobic polymer. Regardless of what occurs during the baking, the heating has the effect of attaching the surfactant to the hydrophobic polymer chains with sufficient tenacity so that the surfactant will remain in place on the membrane during the normal use of the membrane. This of course imparts to the final membrane sufficient hydrophilic properties such that the complete or final membrane has desirable flow characteristics and will normally appear to be acceptable when tested using a bubble point test as indicated in the preceding discussion.

It is considered that it may be desired to rinse any baked membrane produced as indicated in the preceding so as to remove from the membrane any surfactant which may be present and which is not bonded to the polymer structure of the membrane. If desired, one or more rinses may be used for this purpose. Such rinsing avoids the possibility of surfactant being removed from the membrane as the membrane is used in its ultimate application such as, for example, a reverse osmosis application. If such a surfactant should be removed during use of the membrane it would tend to cause contamination in a separation achieved. After such rinsing a rinsed membrane should normally be dried in accordance with conventional practice so as not to detrimentally affect its character following such rinsing prior to being shipped or used.

With all of these procedures for producing membranes in accordance with this invention the surfactant content of the final membrane can be varied by varying the surfactant content of a solution applied to a hydrophobic polymer membrane. In general the higher the surfactant content of the solution or the longer the period that such solution is in contact with the hydrophobic material the greater the surfactant content of the final membrane. The concentrations and times of contact which should be utilized to produce a particular concentration of a surfactant in a particular membrane are best determined on an empirical basis. If a desired concentration of surfactant is not achieved after a single "treatment" as described a procedure as noted for applying a surfactant can be repeated.

The following specific examples are set forth in this specification solely as an aid to an understanding of the subject matter of the present invention. These examples are not intended to delineate all of the specific parameters of the invention, but are merely intended to give information as to the character of the invention so as to facilitate the practice of the invention. For this reason these examples are not considered as being limiting the invention in any respect.

EXAMPLE 1

A desirable microporous membrane can be made by casting a dope type solution containing 11% by weight of a polysulfone polymer having an average molecular weight of about 30,000, 73% by weight dimethyl formamide and 16% by weight isopropyl alcohol in a film of a thickness set by a 500 micron spacing of a doctor blade or knife on a flat stainless steel member and then promptly thereafter placing this film in a deionized water bath at about 25° C. for a period of about one minute. This will result in the production of a hydrophobic membrane. This membrane can then be rinsed twice with deionized water at room temperature and then passed in contact with an aqueous solution containing 0.5% by weight of a block co-polymer of propylene oxide and ethylene oxide having an average molecular weight of about 2750 and a polyoxyethylene content of about 20% by weight for a period of about 30 minutes. On being removed from the latter bath the membrane can then be baked in an oven in air at a temperature of from about 125° to about 150° C. for a period of about three minutes.

EXAMPLE 2

An ultrafilter membrane can be made by casting a solution of about 10% by weight polysulfone, 77% by weight dimethylformamide, 13% by weight acetone in a film and then quenching this film as specified in Example 1. This will result in the production of a hydrophobic membrane as a result of contact with the water. This membrane can then be rinsed twice with deionized water and then soaked in a solution of 0.0425% by weight of the block polymer specified in the preceding Example 1 for a period of one-half hour. On being removed from the latter bath, the membrane can then be baked in an oven in air for a period of ten minutes at a temperature of about 120° C.

EXAMPLE 3

In the formation of a semi-permeable membrane, a dope type solution of 8% by weight polyvinylidine fluoride, 5% by weight glycerine and 87% by weight dimethylformamide can be cast and quenched as indicated in Example 1. A membrane produced as a result of this can then be rinsed twice with deionized water and then placed in contact with an aqueous solution containing 0.0425% by weight of the block polymer specified in Example 1. The processed membrane can then be baked in an oven in air for a period of ten minutes.

EXAMPLE 4

A semi-permeable membrane can be made following the procedure indicated in the preceding Example 1 but substituting for the block co-polymer specified in this preceding Example 1 the same amount by weight of a polyvinyl alcohol product sold by the DuPont corporation, Wilmington, Delaware, U.S.A., under the trademark Evanol®. This product is believed to be a copolymer of polyvinyl alcohol and polyvinyl acetate formed by hydrolyzing polyvinyl acetate in such a manner that in excess of 95% but less than 99% of the acetate groups are not converted to the alcohol.

EXAMPLE 5

A semi-permeable membrane can be made by casting a dope type solution containing about 10.5% by weight of a polysulfone polymer having an average molecular weight of about 30,000, 0.05% by weight of the block polymer specified in Example 1, 73% by weight formamide and the balance by weight isopropyl alcohol in a film of a thickness set by a 500 micron spacing of a doctor blade or knife on a flat stainless steel member and then promptly thereafter placing this film in a deionized water bath of about 25° C. for a period of about one minute. This will result in the production of a porous membrane which can then be rinsed one or more times in deionized water at room temperature. This rinsed membrane can then be baked in an oven in air at a temperature of about 130° C. for a period of about one minute.

EXAMPLE 6

A semi-permeable membrane can be made by varying the procedure specified in Example 1 so as to quench the dope film in a deionized water bath containing 0.5% by weight of a block co-polymer as specified in Example 1. This, of course, alleviates the necessity for the separate step of passing the rinsed membrane into contact with a bath containing this block copolymer specified in Example 1. All other conditions specified in Example 1 remain unchanged.

In any of the preceding examples the procedure specified can be varied by adding the steps of rinsing the baked membranes in deionized water one or more times so as to remove any surfactant which may be present after the baking. A so rinsed membrane is preferably then dried in accordance with conventional practice in air.

We claim:

1. A process for the production of a semi-permeable, porous membrane which comprises a layer of a hydrophobic polymer system, said process comprising the steps of:
   contacting said hydrophobic polymer system with a solution of a polymeric surfactant having both hydrophobic and hydrophilic groups located along its polymer chain and then baking the polymer system with the surfactant in contact with the surface of the polymer system at a temperature of from about 120° C. to about 180° C. for a period sufficient to adhere said surfactant to the surface of said layer to such an extent that it is substantially incapable of being removed from said polymer system during the use of said membrane as a result of said membrane being contacted with water and having a molecular weight of from about 1500 to about 3500.

2. A process as claimed in claim 1 wherein:
   said polymeric surfactant contains hydrophilic groups selected from the group consisting of

—OH, —COOH, —COO—, —SO$_4$, —SO$_3$, =CO, —NH$_2$, —NHR, —NR$_3^+$,

and hydrophobic groups selected from the group consisting of —CH$_3$, =CH$_2$, =CH, —CCl, —CBr, —CF, —CI, —CH$_2$—O—CH—CH$_3$.

3. A process as claimed in claim 1 including:
said surfactant is a block co-polymer of propylene oxide and ethylene oxide having a polyoxypropylene central chain terminated by two polyoxyethylene chains in which the polyoxypropylene central chain contributes from about 70% to about 90% of the molecular weight of the co-polymer.

4. The product produced by the process of claim 3.

5. A process as claimed in claim 1 including:
said polymeric surfactant is a polyvinyl alcohol—polyvinyl acetate co-polymer in which in excess of 60% of the functional groups having hydrophobic and hydrophilic characteristics are alcohol groups and the remainder are acetate groups.

6. A process as claimed in claim 1, wherein:
said polymer system is within a previously formed membrane.

7. A process as claimed in claim 1, wherein:
said surfactant is contacted with said polymer system by being present in the quench bath as said membrane is formed by quenching a dope.

8. A process as claimed in claim 1, wherein:
said surfactant is contacted with said polymer system by being present within a dope from which said polymer system is formed as said dope is quenched to form said membrane.

9. A process as claimed in claim 1, including:
rinsing said membrane with water after said baking so as to remove substantially all unbonded surfactant from said membrane.

10. The product produced by the process of claim 9.

11. The product produced by the process of claim 1.

* * * * *